L. H. HODGES.
TIRE TOOL.
APPLICATION FILED JAN. 22, 1916.
1,216,995.
Patented Feb. 20, 1917.
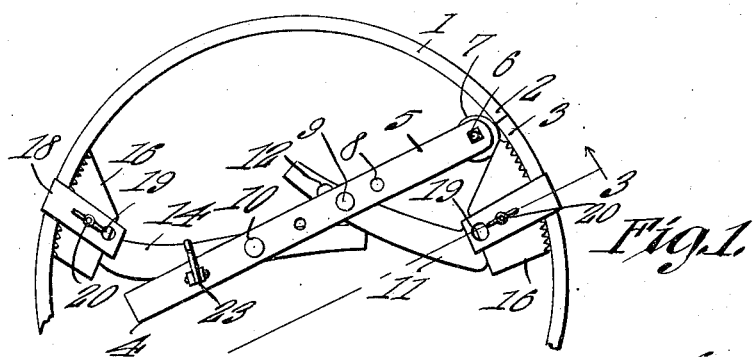
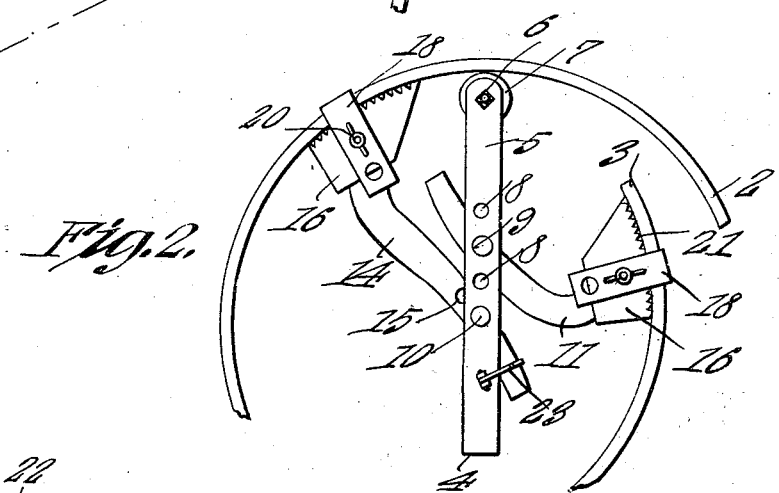
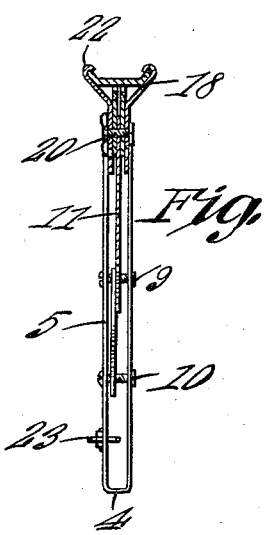
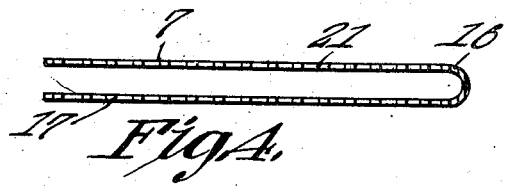
Witnesses
L. H. Hodges,
Inventor
by C. A. Snow & Co.
Attorneys

UNITED STATES PATENT OFFICE.

LUDIA H. HODGES, OF SILVERTON, TEXAS.

TIRE-TOOL.

1,216,995.

Specification of Letters Patent.

Patented Feb. 20, 1917.

Application filed January 22, 1916. Serial No. 73,691.

*To all whom it may concern:*

Be it known that I, LUDIA H. HODGES, a citizen of the United States, residing at Silverton, in the county of Briscoe and State of Texas, have invented a new and useful Tire-Tool, of which the following is a specification.

The device forming the subject matter of this application is adapted to be employed for manipulating a wheel rim, a tire or like object having relatively movable ends.

The invention aims to improve the link and lever construction whereby the ends of the tire or rim may be manipulated, to improve the means whereby the operating mechanism may be secured to the rim or tire and, generally to enhance the utility of devices of that type to which the present invention appertains.

With the above and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

In the accompanying drawing:—

Figure 1 shows in side elevation a tool of the type hereinafter described assembled with a rim, portions of the latter being broken away;

Fig. 2 is a similar view wherein the rim is shown in contracted condition;

Fig. 3 is a section on the line 3—3 of Fig. 1;

Fig. 4 is a plan showing one of the shoes.

In the accompanying drawings there is shown an annular rim 1 separated to form relatively movable ends 2 and 3.

In carrying out the present invention there is provided a lever 4 preferably of U-shape and comprising arms 5 connected adjacent their outer ends by a shaft 6. Supported for rotation by the shaft 6 and located between the arms 5 is a wheel 7. Intermediate its ends the lever 4 is provided with a plurality of openings 8 in certain of which are pivot elements 9 and 10.

The invention comprises a link 11 having openings 12 and a link 14 having openings 15, the openings 12 in the link 11 being adapted to receive the pivot element 9 and the openings 15 in the link 14 being adapted to receive the pivot element 10. Disposed at the outer ends of the links 11 and 14 are shoes 16 which, as shown in Fig. 4 are of U-shape and comprise arms 17 between which lie the outer ends of the links 11 and 14. The outer edges of the shoes 16 are serrated to form teeth 21. Applied to the outer faces of the shoes 16 are opposed grips 18 having approaching, rim engaging fingers 22. The grips 18 are provided with openings 19 adapted to engage holding devices 20 passing through the outer ends of the links 11 and 14, and engaged with the shoes 16, the holding devices being bolt and wing nut members if desired. The lever 4 is provided with a latch which may be in the form of a hook 23 mounted to swing transversely of the lever.

The operation of the structure is as follows: The shoes 16 are placed against the inner curve of the rim 1 as shown in Fig. 1, the grips 18 being engaged with the rim and the holding devices 20 being mounted in place. Thereupon, if the lever 4 be swung to the right in Figs. 1 and 2, the wheel 7 will ride along the inner face of the end 2 of the rim 1, the end 3 of the rim being moved both circumferentially and radially, whereupon the structure will appear as shown in Fig. 2. The hook 23, it is to be observed is double-ended, so that it will engage either with the link 14 upon opposite sides of the pivot 10, to hold the rim 1 expanded, or with the link 11 to hold the rim contracted.

Having thus described the invention, what is claimed is:—

In a device for manipulating a divided rim, a lever; a pair of links pivoted to the lever and extended in opposite directions therefrom; rim-grips at the outer ends of the links; a rim-engaging anti-friction element journaled on the outer end of the lever; the links being pivoted to the lever at appreciable distances from the ends of the lever, whereby the inner end of the lever will form a handle, and whereby the outer end of the lever will form an arm of substantial length adapted to ride along one end of a rim to hold the same outwardly while the other end of the rim is being drawn inwardly, and when the links are disposed at acute angles to the lever; and a latch mechanism connecting the lever with one link to hold the arm in rim-supporting position.

In testimony that I claim the foregoing as my own, I have hereto affixed my signature in the presence of two witnesses.

LYDIA H. HODGES.

Witnesses:
P. P. BOWMAN,
J. G. NORTHCOTT.